April 12, 1927.                 C. L. COOK                 1,624,159
                              PISTON PACKING
                            Filed Jan. 19, 1925

Inventor
C. Lee Cook
By
Attorney

Patented Apr. 12, 1927.

UNITED STATES PATENT OFFICE.

CHARLES LEE COOK, OF LOUISVILLE, KENTUCKY, ASSIGNOR TO C. LEE COOK MANUFACTURING COMPANY, OF LOUISVILLE, KENTUCKY, A CORPORATION OF KENTUCKY.

PISTON PACKING.

Application filed January 19, 1925. Serial No. 3,433.

The present invention relates more particularly to piston rings, and the object is to provide a structure in which the packing ring may be absolutely balanced in so far as steam or motive fluid pressure is concerned. As a consequence mechanical or other means may be utilized for creating a sufficient outward pressure to insure the necessary packing action against the cylinder walls with a minimum amount of friction, and making it possible to accurately calculate or determine the pressure for the particular conditions to be encountered.

Figure 1:
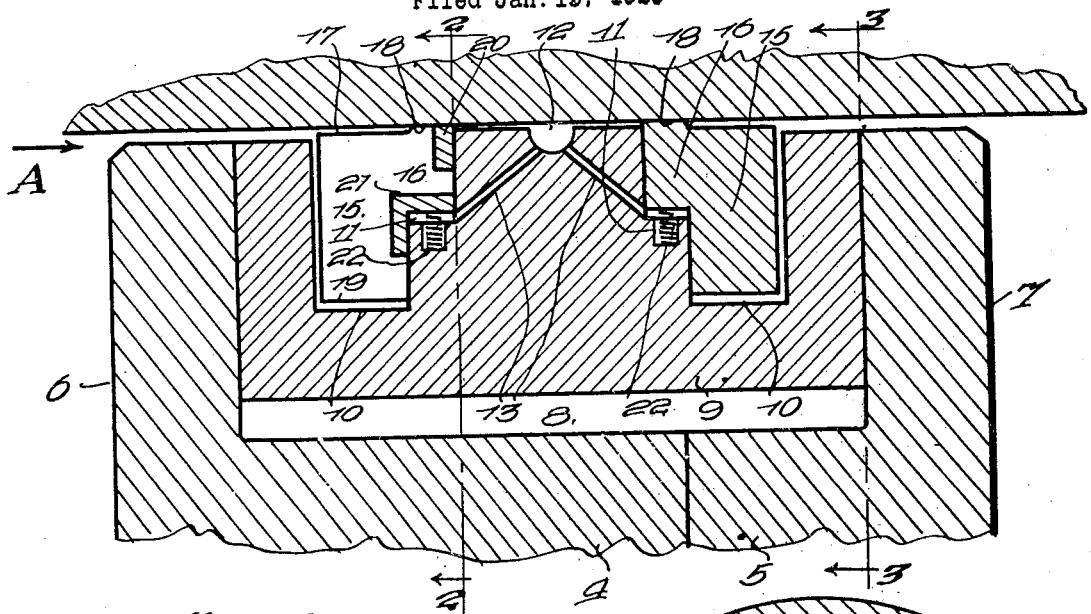

In the accompanying drawings:

Figure 1 is a detail sectional view on an enlarged scale through a portion of a piston and across an embodiment of the novel packing mechanism.

Figure 3:
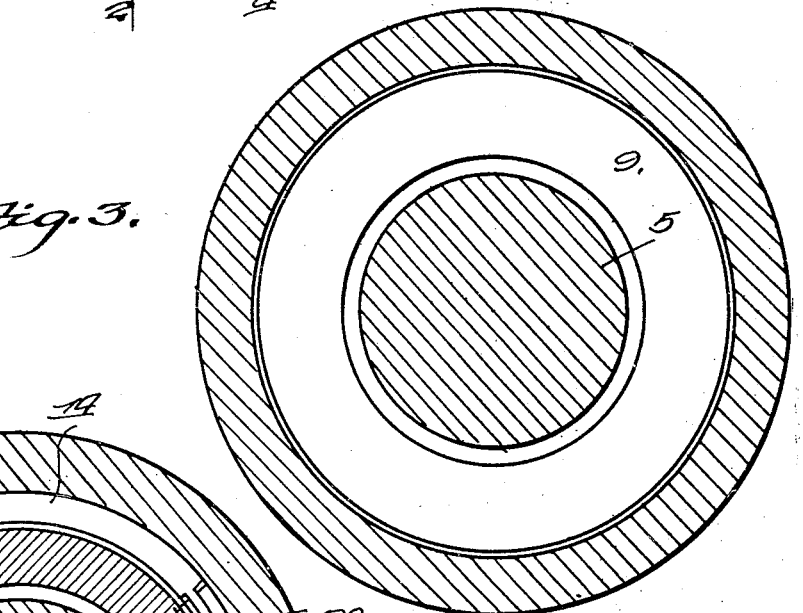
Figure 2:
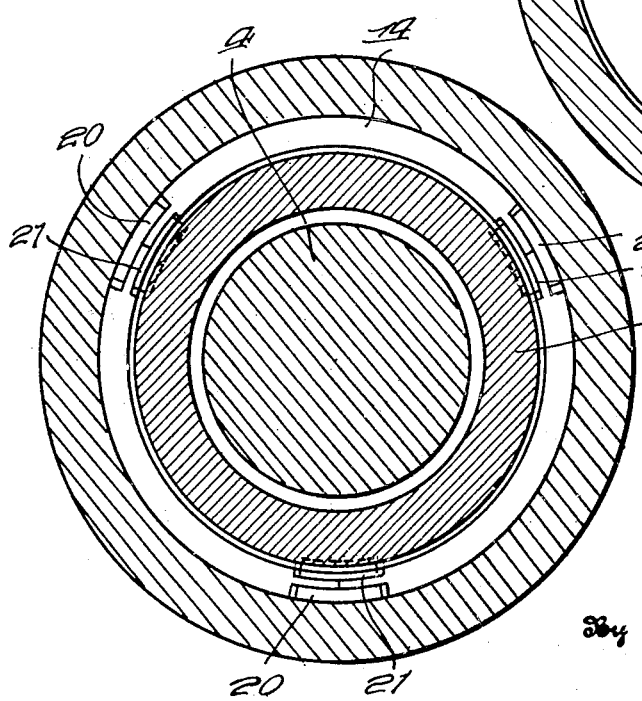

Figures 2 and 3 are sectional views, respectively, on the lines 2—2 and 3—3 of Figure 1, but on a smaller scale and showing the complete cylinder and piston therein.

In the embodiment disclosed, the piston is shown in two parts, designated respectively 4 and 5, the bodies of said parts having flanges 6 and 7 that produce in the peripheral portion of the piston an annular recess 8. In this recess is located a piston ring 9, preferably of a single piece, and having its internal diameter slightly greater than the diameter of the body of the piston 4—5, so that the ring is free to have lateral play or to "float". The piston ring 9 is provided with peripheral annular grooves 10 that are of substantially L-shape, or in other words, these grooves have offset portions 11. Between the grooves there is formed a relief groove 12 and passageways 13 lead from the inner portions of the offsets 11 to said relief groove 12.

In the grooves 10—11 are located packing rings, and as these rings are duplicates, a description of one, it is believed, will be sufficient. The ring is made up of a plurality of sections 14, three being illustrated, and said ring is L-shaped in cross section. The main body, designated 15, fits in the main portion of the groove 10, and the flange 16 is located in the offset 11. The outer surface of the main body 15 is inset, as shown at 17, while the flange portion, which extends outwardly beyond the inset portion, constitutes a bearing surface 18 and holds the inset surface 17 in spaced relation to the cylinder wall. It will be noted that the ring 15—16 is of slightly less width than the groove 10, and consequently motive fluid acting against one side of the piston, as indicated by the arrow A, will pass alongside the piston, and the floating ring 9, and have free access to the inset surface 17 and the opposite inner surface 19 of the body 15 of the ring. Inasmuch as the surfaces 17 and 19 are of the same areas, the steam or motive fluid pressure against the ring will be balanced. In order to insure this, the space behind the flange 16 at the inner end of the offset portion 11 of the groove is made inaccessible to the steam or motive fluid. To this end the joints between the sections 14 of the ring are bridged by sealing plates 20 at the outer side of the ring, and by L-shaped plates 21 in the angle between the body 15 and flange 16 of the ring sections. This space, it will be noted by reference to Figure 1 is open through the passageways 13 to the relief groove 12.

Inasmuch as the ring is balanced in so far as motive fluid pressure is concerned, in order to obtain a predetermined and desired outward pressure against the ring, coiled springs 22 may be employed that operate against the flanges 16, thus urging the ring sections outwardly and creating the necessary bearing of the portions 18 against the cylinder walls.

With this construction, assuming the motive fluid is operating against one side of the piston and in the direction indicated by the arrow A, this motive fluid, as already indicated, will have equal pressure against the outer and inner faces 17 and 19 of the adjacent packing ring, thus permitting the springs 22 to create a predetermined outward pressure against the rings. Should any fugitive motive fluid through leakage gain access to the space behind the flange 16 it can readily pass from this space through the passageway 13 to the groove 12, and from this groove it will in turn find its way through the other groove or grooves past the ring 15 (there being no pressure against this ring), so that the motive fluid can escape to the exhaust side of the piston. By eliminating the action of the steam or motive fluid against the ring, the variation of pressure against said ring under different steam pressure actions in the engine, is eliminated and a constant pressure can be obtained by mechanical means, so that the necessary packing action can be obtained, with a minimum amount of friction and wear. Obviously upon the introduction of steam to the cylinder on the opposite side of the piston, the ring adjacent thereto, which was formerly inactive, becomes the active packing element and the left-hand ring becomes inactive, so that the above operation takes place, but with the other ring as the active packing member for the piston.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:

1. The combination with a piston, of spaced packing rings carried thereby and having portions of their interior surfaces respectively accessible to motive fluid from opposite sides of the piston and vent passageways opening from the inner sides of the rings to the periphery of the piston between the rings.

2. The combination with a piston and a piston ring carried thereby, of substantially L-shaped packing rings carried by the piston ring, means for admitting motive fluid against the inner and outer surfaces of the packing rings, and exhaust permitting means formed in the piston ring and having communication behind the inner faces of the flanges of the packing rings.

3. The combination with a piston and a piston ring carried thereby, of substantially L-shaped packing rings carried by the piston ring, means for admitting motive fluid against the inner and outer surfaces of the packing rings, and an exhaust permitting channel in the piston ring between the flanges of the packing rings, said piston ring having exhaust ports extending to points behind the flanges of the packing rings and said ports being in communication with the channel.

4. The combination with a piston having a peripheral groove and a piston ring in said groove provided with spaced peripheral grooves, packing rings in said grooves, and means for admitting motive fluid from opposite sides of the piston respectively to the inner portions of the grooves and against internal surfaces of the rings, said piston ring having outlet ports for fugitive motive fluid extending from the inner sides of the piston ring grooves to the periphery between the grooves.

5. The combination with a piston having an annular recess in its peripheral portion, of a piston ring therein having spaced substantially L-shaped grooves in its outer portion, substantially L-shaped packing rings in said grooves, the outer surfaces of the main bodies of said rings being inset to permit the access of motive fluid thereagainst, and the outer surfaces of the flanges of the rings bearing against the cylinder walls and holding said inset surfaces in spaced relation thereto, said packing rings and groove walls being spaced to permit the access of motive fluid behind the main bodies of the rings, means for sealing the inner surfaces of the packing ring flanges against the passage of motive fluid thereto, said piston ring having a peripheral groove between the packing rings, and exhaust passageways leading from the inner sides of the packing ring flanges to said grooves.

In testimony whereof, I affix my signature.

CHARLES LEE COOK.